Figure 1:
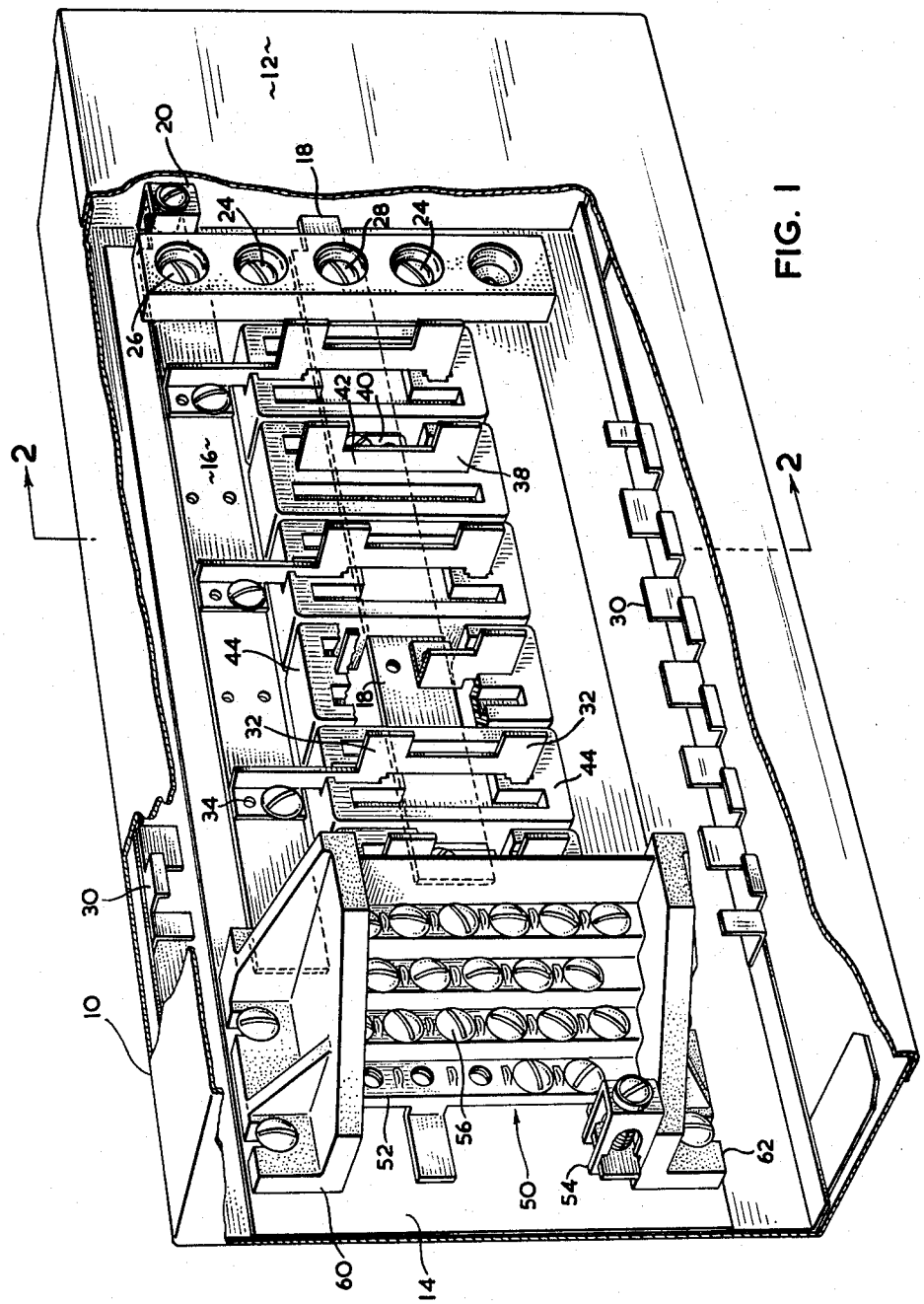

March 2, 1965         B. S. DARLOW            3,172,015
                    DISTRIBUTING PANEL
Filed Oct. 26, 1962                        2 Sheets-Sheet 1

INVENTOR
BRIAN S. DARLOW
BY: *Fetherstonhaugh & Co*
ATTORNEYS

March 2, 1965   B. S. DARLOW   3,172,015
DISTRIBUTING PANEL
Filed Oct. 26, 1962   2 Sheets-Sheet 2
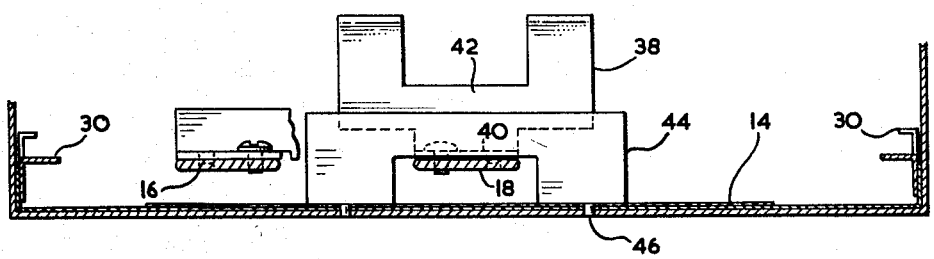
FIG. 2
FIG. 3
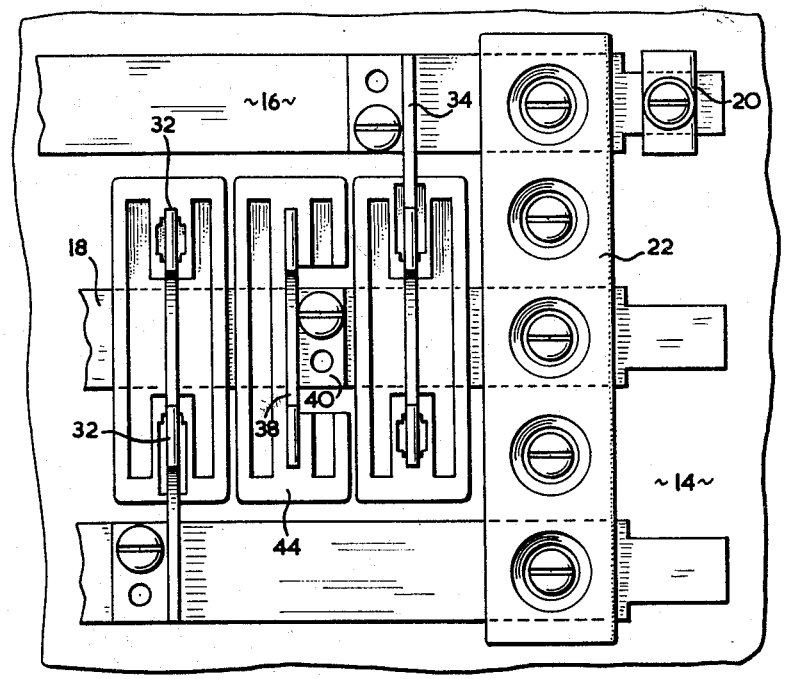
INVENTOR
BRIAN S. DARLOW
BY: *Fetherstonhaugh & Co*
ATTORNEYS

United States Patent Office 3,172,015
Patented Mar. 2, 1965

3,172,015
DISTRIBUTING PANEL
Brian S. Darlow, London, Ontario, Canada, assignor to Taylor Electric Mfg. Co., Limited, London, Ontario, Canada
Filed Oct. 26, 1962, Ser. No. 233,254
Claims priority, application Canada, Dec. 23, 1961, 838,764
1 Claim. (Cl. 317—119)

This invention relates to a distribution panel of the type used for distribution of electrical energy in a home.

It is common practice to provide a distribution panel for domestic load use that has provision for mounting a plurality of mechanical circuit breakers of the general type illustrated in United States Patents Nos. 2,303,959, 2,319,262, 2,360,684, 2,340,206, 2,372,778, 2,422,779, 2,429,722, 2,678,359 and 2,701,284.

This particular distribution panel is for use with mechanical circuit breakers that have what is known as a stab-type contact at their forward end as distinct from a screwdown type contact and the novelty and merit of the invention is thought to reside in the particular manner of supporting the stab contact in the panel assembly for engagement by the breaker and in the stepped neutral block which permits the mounting of a large number of circuit connections to the neutral block in a small amount of space. These features are thought to be novel and to be improvements of known methods of construction in distribution panels of the type under consideration.

Generally speaking, a distribution panel, according to this invention, has a base, bus bars mounted in the base, means including stab-type posts for supporting stab-type circuit breakers in an operative position with respect to the panel and a neutral block. The improvement of this invention is concerned with the connection of the connectors to the bus bars and their support under the stab-type posts thereof, by means of blocks that are formed with channels that embrace the underside of the connectors. The invention will be clearly understood after reference to the following specification read in conjunction with the drawings.

In the drawings, FIGURE 1 is a view of a distribution panel mounted in a box but partly broken away to show construction, and FIGURE 2 is a cross-sectional view along the line 2—2 through the box illustrating how a connector is secured to a bus bar, and FIGURE 3 is a plan view illustrating one end of the box.

The distribution panel illustrated is shown mounted in a box 10 that has a screw-down type cover 12 in accordance with standard practice. The panel, properly speaking, is, of course, electrically insulated from the box by means of a sheet of an insulating fibre board 14 in accordance with standard practice.

In the embodiment of the invention shown, there are two copper bus bars 16 and 18 that are each adapted to be connected to a power take-off terminal of a distribution transformer by means of a connector such as the one 20. The connection of bus bars to power distribution transformers is well known in the art and detailed reference is not made to it. The bus bars 16 and 18 are each supported at one end in spaced relation to the bottom of the panel by means of the supporting block 22. Supporting block 22 is made from an insulating material, has downwardly extending feet that engage with the bottom of the casing 10 and is secured to the casing 10 by means of bolts 24. The underside thereof that supports the bus bars 16 and 18 is cut away to space it from the bottom of the casing. It will be noted that the bus bars 16 and 18 are secured to the block by means of bolts 26 and 28 whereby the bus bars are supported in spaced relation from the insulated bottom 14 of the panel.

Circuit breakers are mounted into the panel by inserting one of the hooks 30 into a preformed socket in the back end of the breaker and rocking the breaker in a forward direction until the spring contacts thereon make electrical contact with a stab post 32 diametrically opposed to the contact 30 about which the breaker is being rocked. The resilience of the sprung contacts retains the circuit breaker in position. This general method of mounting a circuit breaker in a distribution panel; that is, by providing a hook to engage with an opening in the back end thereof and rotating the breaker until resilient contacts at the front end thereof engage with a stab-type post, is well known in the art and detailed reference will not be made to it in this specification.

A feature of this invention is the formation of the stab contacts 32 and the manner in which they are supported. Stab contacts 32 extend at right angles from the base 34 of the connectors that connect with the bus bars 16 and 18. It will be noted that the connectors that connect with the bus bar 16 have a substantial length. On the other hand, connectors 38 that connect with the centre bus bar do not have this length. They merely have a base 40 from which the connectors 42 extend.

Each of the connectors is supported in the area of its stab posts by means of a block of insulating material 44. Blocks 44 have small pins 46 on the underside thereof that enter into openings of the base of the panel whereby they are located with respect to the surface of the base. They are formed on their upper supporting surfaces with channels that receive the underside of the connector that they support. At the same time, the connectors hold the blocks down on the base. It will be noted that the blocks 44 are formed with a channel on their underside whereby they straddle the bus bar 18.

It is possible to add a third bus bar similar to the one 16 but on the opposite side of the box whereby to make a three wire main bus system and, in this event, the downwardly depending legs on each side of the channel on the underside of the blocks 44 serves to provide insulation between the parallel bus bars.

Another feature of this invention is the stepped neutral block generally indicated by the numeral 50. This comprises a metal stepped formation 52 having means for connecting it electrically to the neutral terminal of a distribution transformer such as the connector 54 and a plurality of screws 56 on each of the steps thereof for connecting individual circuits to the neutral block. The arrangement of the connecting screws 56 in stepped relation effects a considerable saving in space.

It will be noted that the metallic stepped connector 52 is retained between the two posts 60 and 62 which are made of an insulating material and bolted to the base of the box.

The manner of using distribution panels of this type with circuit breakers is well known in the art. Circuit breakers, for example, are connected between connectors 30 and stab connectors 32. They have a connection adjacent their back end for connection to a circuit. A circuit is completed from the bus bar through a connector 34 say, through the circuit breaker, through the circuit and back to the neutral block 52 which is connected to the neutral of the distribution transformer.

Embodiments of the invention other than the one illustrated will be apparent to those skilled in the art and it is not intended that the invention should be limited by the embodiment illustrated other than by limitations in the following claim.

What I claim as my invention is:

A distribution panel comprising a base, a plurality of bus bars, means for rigidly mounting said bus bars with respect to said base in parallel spaced apart insulated relation, a plurality of connectors, a plurality of connector block supports made from an insulating material, each of said connector block supports having an upper surface and a lower surface, said upper surface of each of said connector block supports being formed with a first channel adapted to receive a connector, said lower surface of each of said connector block supports being formed with a second channel adapted to straddle one of said bus bars, said connectors having a principal axis that extends at substantially right angles to the principal axis of said bus bars and being rigidly connected at one of their ends to one of said bus bars, the said second channel in each of said connector block supports straddling one of said bus bars and having the lower marginal edge portion of one of said connectors in the first channel thereof whereby said connector block supports are locked in position with respect to said base by the combined action of one of said bus bars and one of said connectors, said connector block supports having a depth such that said bottom surface thereof is adapted to react against said base, each of said connectors having at least one stab-type post thereon and means including said stab-type post for supporting a stab-type circuit breaker in operative position with respect to said base.

References Cited by the Examiner
UNITED STATES PATENTS 2,914,708 11/59 Edmunds _____ 317—119
2,934,660 4/60 Brunner _____ 317—119

LARAMIE E. ASKIN, *Primary Examiner.*

JOHN F. BURNS, *Examiner.*